US008423958B2

(12) United States Patent
Velupillai

(10) Patent No.: US 8,423,958 B2
(45) Date of Patent: Apr. 16, 2013

(54) METHOD FOR MANAGING CONFIGURATION PROFILES OF NETWORK ELEMENTS DEPLOYED IN A NETWORK

(75) Inventor: Manivannan Velupillai, Hoffman Estates, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 660 days.

(21) Appl. No.: 12/638,171

(22) Filed: Dec. 15, 2009

(65) Prior Publication Data

US 2010/0094977 A1    Apr. 15, 2010

Related U.S. Application Data

(63) Continuation of application No. 11/187,224, filed on Jul. 22, 2005, now Pat. No. 7,657,871.

(51) Int. Cl.
  *G06F 9/44* (2006.01)
  *G06F 9/45* (2006.01)

(52) U.S. Cl.
  USPC .......................... 717/121; 717/120; 717/125

(58) Field of Classification Search .......... 717/103–126; 709/203–204
  See application file for complete search history.

(56) References Cited

U.S. PATENT DOCUMENTS

| | | | | |
|---|---|---|---|---|
| 5,339,435 A * | 8/1994 | Lubkin et al. | ................. | 717/121 |
| 5,475,819 A * | 12/1995 | Miller et al. | ................... | 709/203 |
| 6,012,088 A | 1/2000 | Li et al. | | |
| 6,256,773 B1 | 7/2001 | Bowman-Amuah | | |
| 6,473,786 B1 * | 10/2002 | Scouras et al. | ................ | 709/206 |
| 6,535,924 B1 | 3/2003 | Kwok et al. | | |
| 6,594,704 B1 | 7/2003 | Birenback et al. | | |
| 6,640,239 B1 | 10/2003 | Gidwani | | |
| 6,701,514 B1 | 3/2004 | Haswell et al. | | |
| 6,708,327 B1 * | 3/2004 | Aliphas | ......................... | 717/125 |
| 6,751,191 B1 | 6/2004 | Kanekar et al. | | |
| 6,983,449 B2 * | 1/2006 | Newman | ....................... | 717/121 |
| 7,080,132 B2 * | 7/2006 | Cheshire | ....................... | 709/220 |
| 7,089,530 B1 * | 8/2006 | Dardinski et al. | ............ | 717/105 |
| 7,096,459 B2 | 8/2006 | Keller et al. | | |

(Continued)

FOREIGN PATENT DOCUMENTS

WO        03048933 A1      6/2003

OTHER PUBLICATIONS

Garzon et al, "Semi automation of configuration files generation fo rheterogeneous multi tile systems", IEEE, pp. 157-166, 2011.*

(Continued)

*Primary Examiner* — Anil Khatri
(74) *Attorney, Agent, or Firm* — Scott P. Zimmerman PLLC

(57) ABSTRACT

A method for a network having a network element with an original configuration profile stored therewith which specifies operation of the network element in the network includes connecting a server to the network such that the server is in communication with the network element via the network. The server retrieves the original configuration profile from the network element after the network element has been operating in the network. The server analyzes the original configuration profile for compliance with desired characteristics. If the original configuration profile is not in compliance with the desired characteristics, then the server manipulates the original configuration profile to generate a new configuration profile in compliance with the desired characteristics and forwards the new configuration profile to the network element for the network element to store therewith in place of the original configuration profile.

20 Claims, 2 Drawing Sheets

U.S. PATENT DOCUMENTS

| | | | |
|---|---|---|---|
| 7,114,148 B2 * | 9/2006 | Irving et al. | 717/121 |
| 7,203,928 B2 * | 4/2007 | Mandava et al. | 717/124 |
| 7,240,325 B2 | 7/2007 | Keller | |
| 7,257,644 B2 | 8/2007 | Simonnet et al. | |
| 7,278,134 B2 | 10/2007 | Ricke | |
| 7,334,220 B2 * | 2/2008 | Chang et al. | 717/126 |
| 7,451,435 B2 * | 11/2008 | Hunt et al. | 717/120 |
| 7,454,744 B2 * | 11/2008 | Bhogal et al. | 717/122 |
| 7,472,376 B2 | 12/2008 | Burcham et al. | |
| 7,539,746 B2 | 5/2009 | Bankier et al. | |
| 7,594,220 B2 * | 9/2009 | Kodosky et al. | 717/125 |
| 7,672,991 B2 * | 3/2010 | Moreau et al. | 709/203 |
| 7,779,386 B2 * | 8/2010 | Seitz et al. | 717/108 |
| 7,779,389 B2 * | 8/2010 | Markov et al. | 717/121 |
| 7,831,959 B1 * | 11/2010 | Perry et al. | 717/121 |
| 7,984,423 B2 * | 7/2011 | Kodosky et al. | 717/113 |
| 8,028,275 B2 * | 9/2011 | Eldridge et al. | 717/121 |
| 8,234,629 B2 * | 7/2012 | Barajas et al. | 717/121 |
| 8,291,376 B2 * | 10/2012 | Seitz et al. | 717/108 |
| 2002/0163891 A1 | 11/2002 | Natarajan et al. | |
| 2003/0117954 A1 | 6/2003 | De Neve et al. | |
| 2004/0202171 A1 | 10/2004 | Hama | |
| 2005/0021684 A1 | 1/2005 | Hsue et al. | |
| 2007/0022418 A1 | 1/2007 | Velupillai | |

OTHER PUBLICATIONS

Sehgal et al, "Optimizing energy and performance for server class file system workloads", ACM Trans. on Storage, vol. 6, No. 3, article 10, pp. 1-31, 2010.*

Liu, "Rapid application configuration in Amazon cloud using configurable virtual appliance", ACM SAC, pp. 147-154, 2011.*

Dolstra et al, "Service configuration management", ACM SCM, pp. 83-98, 2005.*

Yang et al, "A unified platform for data driven web applications with automatic client server partitioning," ACM WWW pp. 341-350, 2007.

Decasper et al, "Router Plugins: A software architecture for next generation routers," IEEE/ACM Trans. on Networking, vol. 8, No. 1, pp. 2-15, 2000.

Kim et al., "A client profile framework for providing adapted contents in ubiquitous environments," ACM ICPS, pp. 181-184, 2008.

Augustin et al, "Managing the follow line semantics to build large scale pervasive applications," ACM MPAC, pp. 1-8, 2005.

* cited by examiner ion profile to the network element for the network element to store therewith in place of the original configuration profile.

The present disclosure discloses an embodiment of a computer readable storage medium containing executable code that when executed causes a server, connected to a network having a network element with an original configuration profile stored therewith which specifies operation of the network element in the network, to perform steps. The steps include retrieving the original configuration profile from the network element after the network element has been operating in the network. The steps further include analyzing the original configuration profile for compliance with desired characteristics. The steps further include, if the original configuration profile is not in compliance with the desired characteristics, then manipulating the original configuration profile to generate a new configuration profile in compliance with the desired characteristics and forwarding the new configuration profile to the network element for the network element to store therewith in place of the original configuration profile.

FIG. 1 illustrates a system 10 in accordance with one non-limiting aspect of the present disclosure. System 10 may include a number of network elements 14-24 configured to facilitate servicing electronic services for a number of customers 30-32. Network elements 14-24 may be configured to interact with each other and customers 30-32. A management server 34 may be provided to facilitate managing operation of network elements 14-24.

A network 36 may be provided by network elements 14-24 to facilitate electronic data transmissions therebetween. Network 36 may be a public telephone switching network (PSTN), advanced intelligent network (AIN), wireless intelligent networks (WIN), time division multiplex (TDM) network, packet switching or IP network, VoIP network, and the like. Network 36 may include any type of infrastructure for supporting the operation thereof, such as terrestrial or extraterrestrial, wireless or wireline line infrastructures and/or some combination thereof. Network 36 may be configured to transmit electronic data according to any protocol and standard, including TCP/IP, UDP, SONET, etc.

Network elements 14-24 may include any type of network element associated with a telecommunication, television, data, satellite, and/or cable system. For example, the network elements may be routers, gateways, hubs, central offices (COs), service switching points (SSP), soft switches, signal transfer points (STPs), service control points (SCPs), service nodes (SNs), service package applications (SPAs), mobile switching centers (MSCs), home location registers (HLRs), visitor location registers (VLRs), server offices, server switches, feature servers, application program interfaces (APIs), hubs, bridges, servers, and the like.

Management server 34 may include a tool (not shown) to facilitate managing operation of various network elements 14-24. The tool may be configured to control operation of management server 34 in such a manner as to facilitate controlling operation of various network elements 14-24. In accordance with one non-limiting aspect of the present disclosure, server 34 may be configured to communicate with network elements 14-24 so as to facilitate managing configuration profiles associated therewith. Management server 34 may include or be configured to communicate with a database. The database may be configured to store electronic data for use by server 34 and/or network elements 14-24.

FIG. 2 illustrates a flowchart 38 of a method of managing configuration profiles of network elements 14-24 in accordance with one non-limiting aspect of the present disclosure. The method may be executed by a tool included within server 34 and/or by any other suitable device included within the

METHOD FOR MANAGING CONFIGURATION PROFILES OF NETWORK ELEMENTS DEPLOYED IN A NETWORK

CROSS-REFERENCE TO RELATED APPLICATIONS

This application is a continuation of U.S. application Ser. No. 11/187,224, filed Jul. 22, 2005, and now issued as U.S. Pat. No. 7,657,871, which is hereby incorporated by reference in its entirety.

BACKGROUND OF THE DISCLOSURE

1. Field of the Disclosure

The present disclosure relates to methods and system of managing configuration profiles of a plurality of deployed network elements.

2. Background Art

Configuration profiles and other parameters associated with operation of routers and other network elements deployed in a network may be manually backed up using a PCMIA card or other localized medium, which typically requires a technician or other experienced individual. If the router goes down or otherwise experiences a fault condition, its return to operation may be dependent on restoration of the configuration profile stored on the local PCMIA card.

Because the configuration profiles are stored locally, a technician must be dispatched to the router to instigate a manual restoration using the PCMIA card backup. The importance of these PCMIA backups is critical to insure there is a recent restoral point for the network element. If there is not a recent backup, much data can be lost.

DETAILED DESCRIPTION OF THE PREFERRED EMBODIMENT(S)

Figure 1:
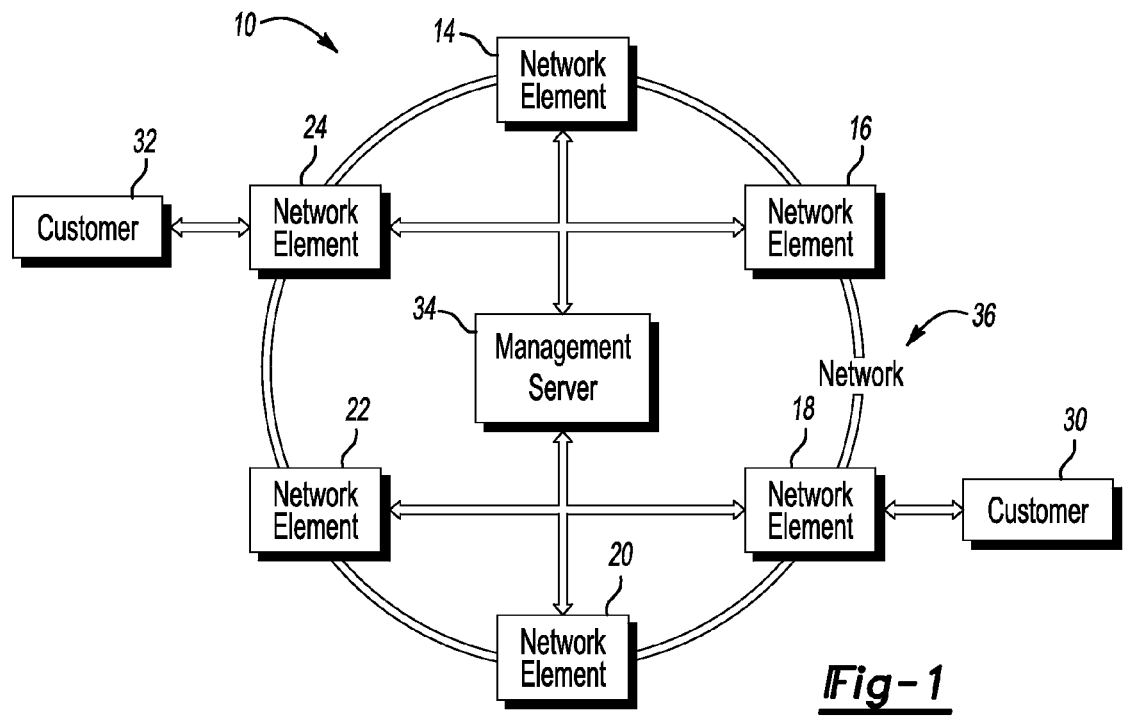
FIG. 1 illustrates a system in accordance with one non-limiting aspect of the present disclosure.
Figure 2:
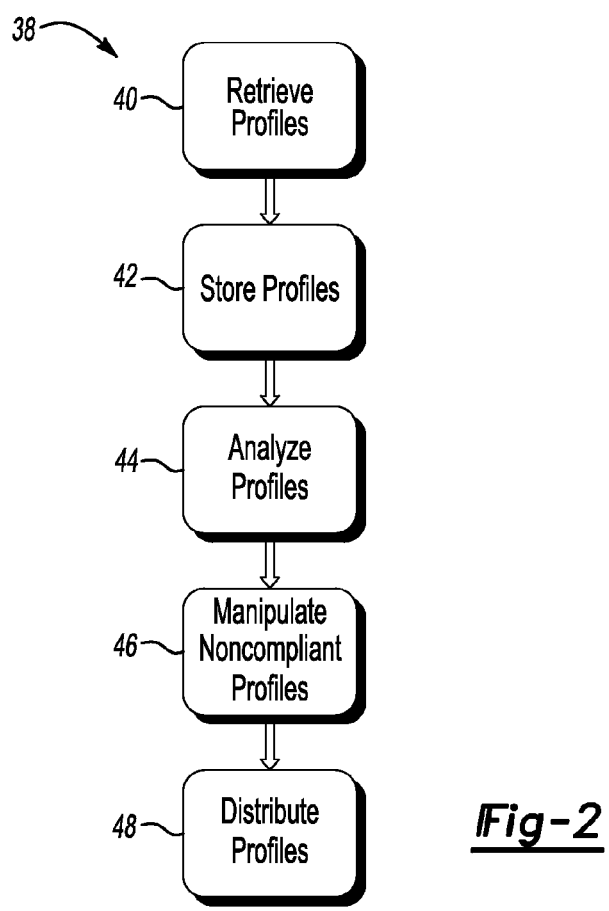
FIG. 2 illustrates a method of managing configuration profiles of the network elements in accordance with one non-limiting aspect of the present disclosure.

The present disclosure discloses an embodiment of a method for a network having a network element with an original configuration profile stored therewith which specifies operation of the network element in the network. The method includes connecting a server to the network such that the server is remotely located from the network element and is in communication with the network element via the network. The method further includes retrieving by the server via the network the original configuration profile from the network element after the network element has been operating in the network. The method further includes analyzing by the server the original configuration profile for compliance with desired characteristics. The method further includes, if the original configuration profile is not in compliance with the desired characteristics, then manipulating by the server the original configuration profile to generate a new configuration profile in compliance with the desired characteristics and forwarding by the server via the network the new configurasystem. The method may be embodied in a logical medium suitable for directing, controlling, manipulating, and performing operations associated with the execution thereof.

Block 40 relates to retrieving configuration profiles from one or more of network elements 14-24. The configuration profiles generally relate to electronic data associated with the operation of network elements 14-24. Each network element 14-24 may include a number of different operation characteristics and parameters for controlling the operation thereof. This information and other information associated with directing and controlling operation of network elements 14-24 may be included with the configuration profile.

The configuration profile may be used to specify variables associated with the operation of network elements 14-24. As one skilled in the art will appreciate, each network element 14-24 may have one or more different parameter settings and other variables depending on the operations associated therewith. For example, different routers in the system may have any number of different configuration profiles depending on the number of customers supported, performance and quality of service requirements, and the like. If network elements 14-24 should experience a fault condition or experience other interruptions in the operation thereof, the configuration profile may be used to restore the operation thereof.

The tool may control server 34 to poll network elements 14-24 for the configuration profiles associated therewith. For example, the tool may be configured to periodically output instructions to network elements 14-24 for requesting transport of their configuration profiles to server 34 and/or the tool may issue instructions for configuring network elements 14-24 to automatically transport their configurations profiles upon occurrence of a triggering event, such as on the first day of each calendar month and/or upon any changes thereto.

The configuration profiles may be retrieved after network elements 14-24 are deployed in system 10. This may be advantageous for retrieving changes in the configuration profiles made by technicians at a local level. For example, various network elements 14-24 may include a base or global configuration profile which allows it to initially operate and communicate when deployed in system 10. This configuration profile, however, may be adapted once deployed to support particular operations and features. Commonly a technician or other experienced individual may be used to adjust the parameters of the network element once deployed to conform its configuration profile to desired operation settings. By retrieving the configuration profiles after such deployment, the present disclosure is able to retrieve the particular configuration file used by deployed network elements 14-24 after it has been locally provisioned after deployment.

Block 42 relates to storing the retrieved configuration profiles in a database. The database may be included on server 34 or otherwise in communication therewith. It may be configured to support computation and other analysis of the configuration profiles. The configuration profiles may include a network element identifier which may be used in storing the configuration profiles on the database in a logical order. For example, configuration profiles associated with particular types of network elements 14-24 may be associated with each other to facilitate the analysis thereof.

Block 44 relates to analyzing the configuration profiles for compliance with desired management characteristics. The desired management characteristics may relate to various account, inventory, traffic, historical info, and other information which may be gleaned from the stored configuration profiles. The tool may be configured to automatically analyze the stored configuration files based on any number of algorithms associated with desired settings and features for the configuration profiles.

In general, the analyzing step may be used to determine whether the configuration profile corresponds to required operation settings and to troubleshoot the profiles if errors are found therein. For example, each profile may be individually analyzed by the tool or an operator thereof to determine whether the profile is in compliance with any number of different management requirements. Non-compliant configuration profiles may be flagged or otherwise designated, such through alerts or other messages being sent to a network administrator.

Block 46 relates to manipulating the non-compliant configuration profiles into compliance with the desired management characteristics. This may require manipulating one or more of the configuration profiles according to one or more different settings. In more detail, different desired management characteristics may be assigned to different network elements. Accordingly, the configuration profiles may need to be manipulated to correspond with the desired management characteristics associated with that particular type of network element 14-24.

To facilitate the manipulation process, the network element identifiers optionally included with the retrieved configuration profiles may be cross-referenced with various management characteristics. In this manner, the tool may lookup or otherwise locate the desired operation characteristics for the configuration profiles of each network element. Once manipulated, the manipulated configuration profiles may be stored in place of the originally downloaded configuration files.

Block 48 relates to distributing one or more of the stored configuration profiles to one or more of network elements 14-24. The distributed configuration profiles may be one of the originally downloaded profiles or a profile manipulated into compliance with the desired management characteristics. The tool may be configured to distribute the configuration profiles to the network elements associated therewith according to any number of triggers.

One trigger may relate to determining a fault condition for one of the network elements. The fault condition may be determined by the tool polling the network element for its current conditions and/or by the tool receiving a message from the network element, such as through an automatic fault reporting program included on the network element. The tool may then locate and distribute an appropriate configuration profile to the network element experiencing the fault condition.

As described above, the tool may periodically go to router and other network elements and extract all the configuration data and populate a separate database with this information. This automated process would negate the need for the manual technician process using the PCMIA card. Once this information is stored in separate data base, the present disclosure may be used to generate many reports based on the data that was taken from the router. You can generate accounting data, inventory, traffic info, historical info, and you would have a secure backup.

Figure 3:
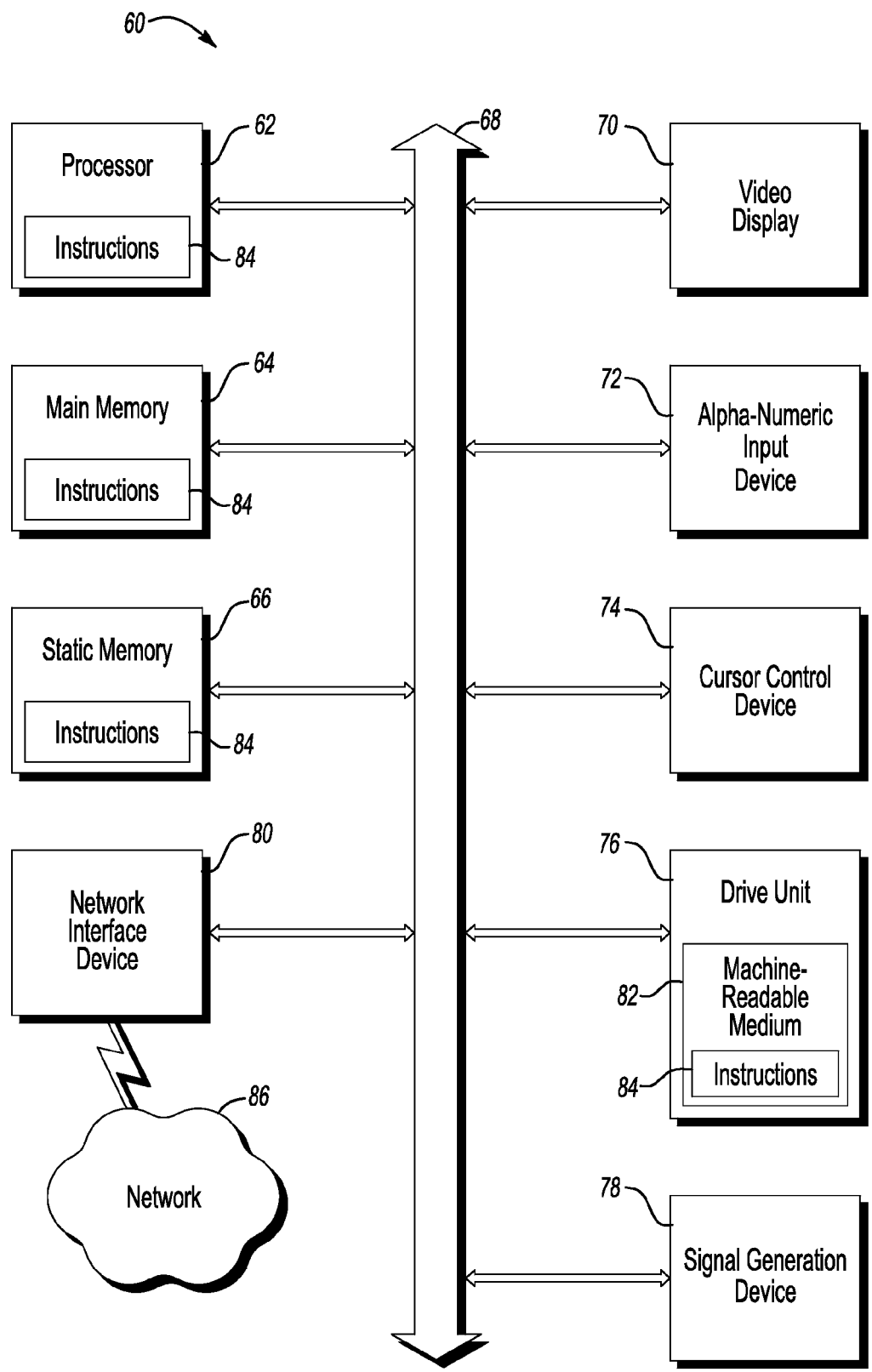
FIG. 3 illustrates a diagrammatic representation of a machine in accordance with one non-limiting aspect of the present disclosure.

FIG. 3 is a diagrammatic representation of a machine in the form of a computer system 60 within which a set of instructions, when executed, may cause the machine to perform any one or more of the methodologies discussed herein. In some embodiments, the machine operates as a standalone device. In some embodiments, the machine may be connected (e.g., using a network) to other machines In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

Computer system 60 may include a processor 62 (e.g., a central processing unit (CPU), a graphics processing unit (GPU), or both), a main memory 64 and a static memory 66, which communicate with each other via a bus 68. Computer system 60 may further include a video display unit 70 (e.g., a liquid crystal display (LCD), a flat panel, a solid state display, or a cathode ray tube (CRT)). Computer system 60 may include an input device 72 (e.g., a keyboard), a cursor control device 74 (e.g., a mouse), a disk drive unit 76, a signal generation device 78 (e.g., a speaker or remote control) and a network interface device 80.

Disk drive unit 76 may include a machine-readable medium 82 on which is stored one or more sets of instructions (e.g., software 84) embodying any one or more of the methodologies or functions described herein, including those methods illustrated in herein above. Instructions 84 may also reside, completely or at least partially, within main memory 64, static memory 66, and/or within processor 62 during execution thereof by computer system 60. Main memory 64 and processor 62 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 84, or that which receives and executes instructions 84 from a propagated signal so that a device connected to a network environment 86 can send or receive voice, video or data, and to communicate over network 86 using instructions 84. Instructions 84 may further be transmitted or received over network 86 via network interface device 80.

While machine-readable medium 82 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the present disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the present disclosure is not limited to such standards and protocols. Each of the standards for Internet and other packet switched network transmission (e.g., TCP/IP, UDP/IP, HTML, HTTP) represent examples of the state of the art.

Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. The present disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for managing configuration files, the method comprising:
   receiving a poll from a server requesting a configuration file from a router in a communications network;
   determining a local provision of the configuration file after deployment;
   sending the configuration file from the router to the server in response to the poll when the configuration file is locally provisioned;
   receiving a compliant configuration file from the server that conforms to a policy;
   replacing the configuration file stored in memory of the router with the compliant configuration file received from the server;
   reconfiguring the router according to the compliant configuration file; and
   sending the compliant configuration file from the router in response to a subsequent poll from the server.

2. The method of claim 1 further comprising retrieving a network identifier associated with the router.

3. The method of claim 2, further comprising associating the network identifier to the policy.

4. The method of claim 1, further comprising ignoring a pre-deployment configuration file stored prior to the deployment.

5. The method of claim 1, further comprising automatically sending the configuration profile from the router to the server in response to a trigger.

6. The method of claim 1, further comprising periodically sending the configuration file from the router according to a calendar.

7. The method of claim 1, further comprising restoring the router according to the compliant configuration file.

8. A system, comprising:
   a processor; and
   memory for storing code that when executed causes the processor to perform operations, the operations comprising:
   receiving a poll from a server requesting a configuration file from a router in a communications network;
   determining a local provision of the configuration file after deployment;
   determining the configuration file is locally provisioned in the memory;
   sending the configuration file from the router to the server in response to the poll when the configuration file is locally provisioned;
   receiving a compliant configuration file from the server that conforms to a policy;
   replacing the configuration file stored in memory of the router with the compliant configuration file received from the server;
   reconfiguring the router according to the compliant configuration file; and
   sending the compliant configuration file from the router in response to a subsequent poll from the server.

9. The system according to claim 8, wherein the operations further comprise retrieving a network identifier associated with the router.

10. The system according to claim 8, wherein the operations further comprising associating the network identifier to the policy.

11. The system according to claim 8, wherein the operations further comprising ignoring a pre-deployment configuration file stored prior to the deployment.

12. The system according to claim 8, wherein the operations further comprise automatically sending the configuration profile from the router to the server in response to a trigger.

13. The system according to claim 8, wherein the operations further comprising periodically sending the configuration file from the router according to a calendar.

14. The system according to claim 8, wherein the operations further comprise restoring the router according to the compliant configuration file.

15. A computer readable storage memory on which is encoded processor executable instructions for performing operations, the operations comprising: receiving a poll from a server requesting a configuration file from a router in a communications network;
   determining a local provision of the configuration file after deployment;
   determining the configuration file is locally provisioned in the memory;
   sending the configuration file from the router to the server in response to the poll when the configuration file is locally provisioned;
   receiving a compliant configuration file from the server that conforms to a policy; replacing the configuration file stored in memory of the router with the compliant configuration file received from the server;
   reconfiguring the router according to the compliant configuration file; and
   sending the compliant configuration file from the router in response to a subsequent poll from the server.

16. The computer readable storage memory according to claim 15, further comprising instructions for retrieving a network identifier associated with the router.

17. The computer readable storage memory according to claim 16, further comprising instructions for associating the network identifier to the policy.

18. The computer readable storage memory according to claim 15, further comprising instructions for ignoring a pre-deployment configuration file stored prior to the deployment.

19. The computer readable storage memory according to claim 15, further comprising instructions for automatically sending the configuration profile from the router to the server in response to a trigger.

20. The computer readable storage memory according to claim 15, further comprising instructions for periodically sending the configuration file from the router according to a calendar.

* * * * *